United States Patent
Baek et al.

(10) Patent No.: US 11,632,418 B2
(45) Date of Patent: Apr. 18, 2023

(54) METHOD AND APPARATUS FOR MANAGING ACCESS TO FILE STORED IN A REMOTE LOCATION

(71) Applicant: SAMSUNG SDS CO., LTD., Seoul (KR)

(72) Inventors: Seung Min Baek, Seoul (KR); Yee Soo Ahn, Seoul (KR); Jeong Woo Kim, Seoul (KR); Hyo Jin Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/826,931

(22) Filed: May 27, 2022

(65) Prior Publication Data

US 2022/0385723 A1 Dec. 1, 2022

(30) Foreign Application Priority Data

May 28, 2021 (KR) .......................... 10-2021-0068978

(51) Int. Cl.
*H04L 67/06* (2022.01)
*G06F 16/11* (2019.01)
*H04L 67/52* (2022.01)
*H04L 67/1097* (2022.01)

(52) U.S. Cl.
CPC ............ *H04L 67/06* (2013.01); *G06F 16/122* (2019.01); *H04L 67/1097* (2013.01); *H04L 67/52* (2022.05)

(58) Field of Classification Search
CPC .... H04L 67/06; H04L 67/1097; G06F 16/122
See application file for complete search history.

(56) References Cited

U.S. PATENT DOCUMENTS

| | | | |
|---|---|---|---|
| 10,924,528 B1* | 2/2021 | Korobov | G06F 16/178 |
| 2004/0255289 A1 | 12/2004 | Bethlehem et al. | |
| 2012/0297311 A1 | 11/2012 | Duggal | |
| 2014/0082051 A1* | 3/2014 | Yu | H04L 67/06 |
| | | | 709/203 |
| 2019/0222560 A1 | 7/2019 | Ford et al. | |
| 2020/0188132 A1* | 6/2020 | Ryan | A61F 2/4455 |

(Continued)

FOREIGN PATENT DOCUMENTS

| CN | 107295070 A | 10/2017 |
|---|---|---|
| JP | 2006-051967 A | 2/2006 |
| KR | 10-2010-0072770 A | 7/2010 |

(Continued)

OTHER PUBLICATIONS

European Search Report For EP22175820.4 dated Sep. 28, 2022 from European patent office in a counterpart European patent application.

*Primary Examiner* — Viet D Vu
(74) *Attorney, Agent, or Firm* — The PL Law Group, PLLC

(57) ABSTRACT

An apparatuses for managing access to a file stored in a remote location includes detecting an attempt for a user terminal to access the file stored in the remote location, determining a location where the file attempted to be access is to be opened, in response to a determination that the location where the file is to be opened is remote, opening the file and providing a content of the opened file to the user terminal by a file management server and in response to a determination that the location where the file is to be opened is local, processing the file to be downloaded to the user terminal by the file management server.

18 Claims, 14 Drawing Sheets

(56) References Cited

U.S. PATENT DOCUMENTS

2020/0322415 A1* 10/2020 Magazine ............... H04L 65/61
2022/0191288 A1*  6/2022 Harshith ................. G06F 9/452

FOREIGN PATENT DOCUMENTS

| KR | 10-2015-0040835 A | 4/2015 |
| KR | 10-1516717 B1 | 5/2015 |
| KR | 10-1705197 B1 | 2/2017 |

* cited by examiner

METHOD AND APPARATUS FOR MANAGING ACCESS TO FILE STORED IN A REMOTE LOCATION

CROSS-REFERENCE TO RELATED APPLICATION

This application claims the benefit under 35 USC § 119 of Korean Patent Application No. 10-2021-0068978 filed on May 28, 2021 in the Korean Intellectual Property Office, the entire disclosure of which is incorporated herein by reference for all purposes.

BACKGROUND

1. Technical Field

The present disclosure relates to a method and apparatus for managing a file. More specifically, the present disclosure relates to a method and apparatus for managing access to a file stored in a remote location.

2. Description of the Related Art

The network drive is a type of shared disk implemented on a server and available for access a plurality of clients. The client may access the network driver and edit a file via network. The network drive is used to share significant documents within a company, and store personal data.

Such access to the network drive is managed via the server. In other words, the server may control access to the file stored in the network drive. In addition, the server may store log data for users who access the file, and strictly regulate the exposure of files.

However, since all editing events (e.g., open, save, delete, close, etc.) for files included in the network drive are handled by the server, the server may be overloaded when the editing events occur intensively. In this case, the handling of the editing events may be delayed, which may also lead to the loss of content of the edited file.

Accordingly, it is worth considering supplementing and reinforcing managed server resources in the network drive, but such additional building can act as a factor to increase the costs of the entire system.

SUMMARY

Technical aspects to be achieved through one embodiment by the present disclosure provide a method and apparatus for managing a file that stably handle the file stored in a remote location by reducing server overloads.

Other technical aspects to be achieved through other embodiments by the present disclosure also provide a method and apparatus for managing a file that prevent exposure of a security-sensitive file.

Another technical aspect to be achieved through other embodiments by the present disclosure provides a method and apparatus for managing a file, capable of handling editing events at high speed.

Technical aspects of the present disclosure are not restricted to those set forth herein, and other unmentioned technical aspects will be clearly understood by one of ordinary skill in the art to which the present disclosure pertains by referencing the detailed description of the present disclosure given below.

In some embodiments, a method manages access to a file stored in a remote location may include, detecting an attempt for a user terminal to access the file stored in the remote location, determining a location where the file attempted to be access is to be opened, in response to a determination that the location where the file is to be opened is remote, opening the file and providing a content of the opened file to the user terminal by a file management server; and in response to a determination that the location where the file is to be opened is local, processing the file to be downloaded to the user terminal by the file management server.

In some embodiments, the determining of a location where the file is to be opened, may include, identifying the cumulative number of storages that a storage operation launches for the file and when the cumulative number of storages is less than or equal to a threshold number, determining the location where the file is to be opened as remote, and when the cumulative number of storages is higher than a threshold number, determining the location where the file is to be opened as local.

In some embodiments, the determining of a location where the file is to be opened, may include, identifying the cumulative number of storages that is indicative of the sum of the storage operations of each file generated by a user and when the cumulative number of storages is less than or equal to a threshold number, determining the location where the file is to be opened as remote, and when the cumulative number of storages is higher than the threshold number, determining the location where the file is to be opened as local.

In some embodiments, the determining of a location where the file is to be opened, may include, determining the location where the file is to be opened, identifying a current time and when the current time is not included in a preset overload time, determining that the location where the file is to be opened as remote and when the current time is included in the overload time, determining the location where the file is to be opened as local.

In some embodiments, the determining of a location where the file is to be opened, may include, identifying the amount of available resources of the file management server or a file storage server of the remote location and when the amount of available resources is within a permittable range, determining the location where the file is to be opened as remote, and when the amount of available resources is deviated from the permittable range, determining the location where the file is to be opened as local.

In some embodiments, the determining of a location where the file is to be opened, may include, identifying the user and when the identified user is not included in a user list permitted to download, determining the location where the file is to be opened as remote, and when the identified user is included in the user list permitted to download, determining the location where the file is to be opened as local.

In some embodiments, the determining of a location where the file is to be opened, may include identifying a department to which the user belongs and when the department is not included in a department list permitted to download, determining the location where the file is to be opened as remote and when the department is included in the department list permitted to download, determining the location where the file is to be opened as local.

In some embodiments, the determining of a location where the file is to be opened, may include, identifying a security level applied to the file and identifying whether the file is a file permitted to download based on the identified security level and when the file is a file not permitted to download, determining the location where the file is to be opened as remote, and when the file is the file permitted to download, determining the location where the file is to be opened as local.

In some embodiments, the security level of the file is based on at least one of a rank of the department to which the user belongs, a rank of the user, or the number of compliance violation keywords included in the file.

In some embodiments, the determining of a location where the file is to be opened, may include, identifying a size of the file and when the identified size of the file is higher than a threshold size, determining the location where the file is to be opened as remote, and when the identified size of the file is less than or equal to the threshold size, determining the location where the file is to be opened as local.

In some embodiments, the determining of a location where the file is to be opened, may include, detecting a state of a network between the remote location and the user terminal and when the state of the network is determined to be stable, determining the location where the file is to be opened as remote, and when the state of the network is determined to be unstable, determining the location where the file is to be opened as local.

In some embodiments, the providing of a content of the opened file to the user terminal, may include, opening the file using the resources of the file management server and displaying the opened file to the user terminal by an editable user interface.

In some embodiments, the providing of a content of the opened file to the user terminal, may include, when the storage operation for the file takes place on the user interface, updating the file by reflecting an edited content on the user terminal by the server management server.

In some embodiments, a method manages access to a file stored in a remote location may further include, opening the downloaded file by the user terminal and editing the downloaded file and when the file is updated via the editing, replacing the file stored in the remote location with the updated file by receiving the updated file from the user terminal by the file management server.

According to another aspect of the present disclosure, a computing device including, one or more processors, a memory configured to load a computer program executed by the processor and a storage configured to store the computer program is provided. The computer program may include instructions that cause the processor to perform operations including, detecting an attempt for a user terminal to access a file stored in a remote location, determining a location where the file attempted to be access is to be opened, in response to a determination that the location where the file is to be opened is a remote location, opening the file and providing a content of the opened file to the user terminal by a file management server and in response to a determination that the location where the file is to be opened is local, processing the file to be downloaded to the user terminal by the file management server.

According to another aspect of the present disclosure, a method for managing access to a file stored in a remote location is provided. The method may include, requesting the file stored in the remote location, determining a location where the file is to be opened, when the location where the file is to be opened is determined as remote, opening the file via resources of the remote location and receiving a content of the opened file from a server of the remote location and when the location where the file is to be opened is determined as local, downloading the requested file from the server of the remote location and opening the downloaded file using the local resources.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
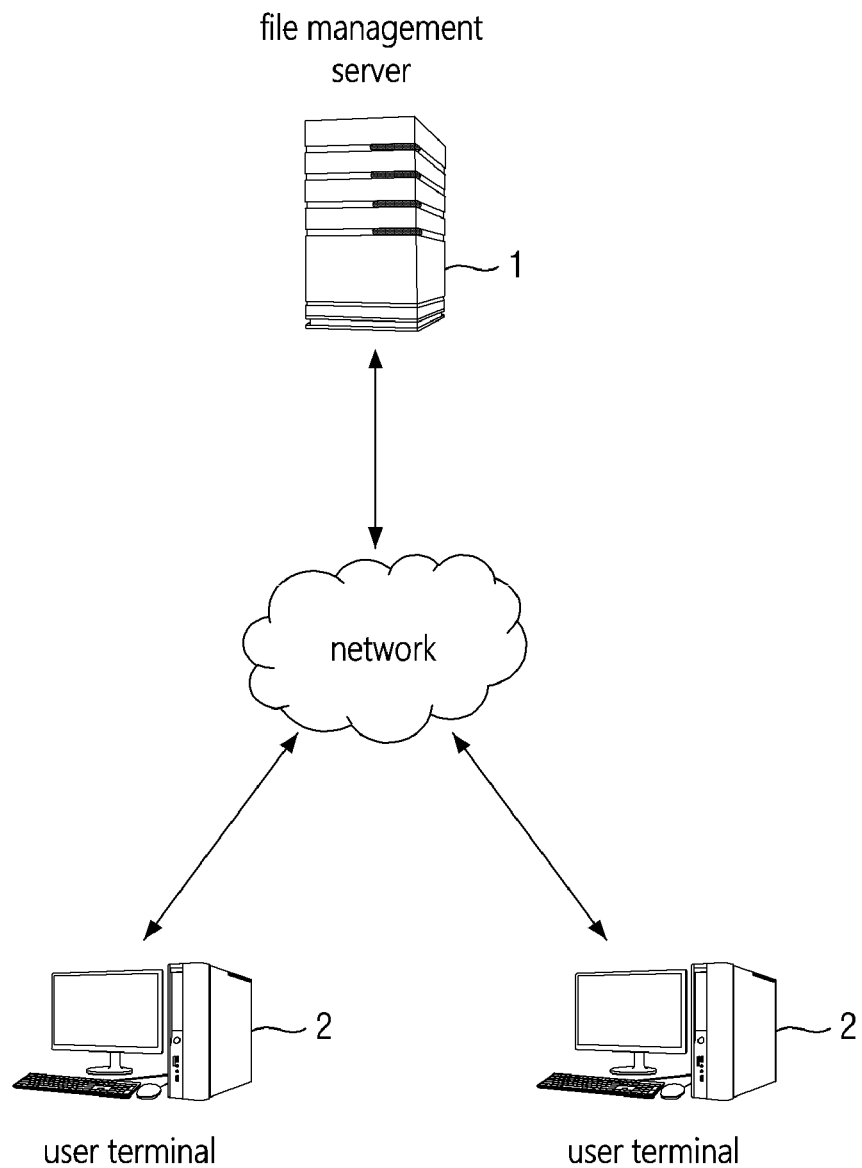
FIG. 1 is a view illustrating a system for managing a file according to one embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

FIG. 1 is a view illustrating a system for managing a file according to one embodiment of the present disclosure.

Referring to FIG. 1, the system for managing a file according to one embodiment of the present disclosure may include a plurality of user terminals 2 and a file management server 1.

The file management server 1 may be a computing device that manages the file included in a network drive. The file management server 1 may store user information including ID, a password, name and the user's department. In some embodiments, the file management server 1 may include the users' rank and the department's rank. Herein, the users' rank and the department's rank refer to quantifying the user's authority and the department's authority capable of downloading the files having security levels set therein. Higher ranks may allow downloading the files with higher security levels.

The file management server 1 may transmit a file list included in the network drive to the user terminal 2, and when the file management server 1 detects access to the file included in the file list, it may determine whether a location where the file is to be opened is local or remote. According to a result of the determination, the file management server 1 may process the file to be downloaded to the user terminal 2, or it may directly open the file and provide a content of the opened file to the user terminal 2. In some embodiments, the file management server 1 may include network drivers classified for each user, and when the user terminal 2 accesses the network driver, the file management server 1 may identify the network driver that corresponds to identification information of the corresponding user and then transmit the file list included in the identified network driver to the user terminal 2.

In some embodiments, the file management server 1 may be implemented in the form of a virtual machine and mounted on a cloud computing system, and the network drive may be included in the cloud computing system.

The user terminal 2 is a device that may be used by the user accessing the network drive, and may include computing devices such as smartphones, tablet PCs, and laptops. The user terminal 2 may access the file included in the network drive via the file management server 1. The user terminal 2 may download the file and open it using local resources, or may receive the content of the file opened by the file management server 1. In some embodiments, an agent for managing the file may be mounted on the user terminal 2, and the agent may provide a user interface capable of editing a remote file.

So far, the file management system according to one embodiment of the present disclosure has been described with reference to FIG. 1. Hereinafter, referring to FIGS. 2 to 11, a method for managing a file according to one embodiment of the present disclosure will be described.

Figure 2:
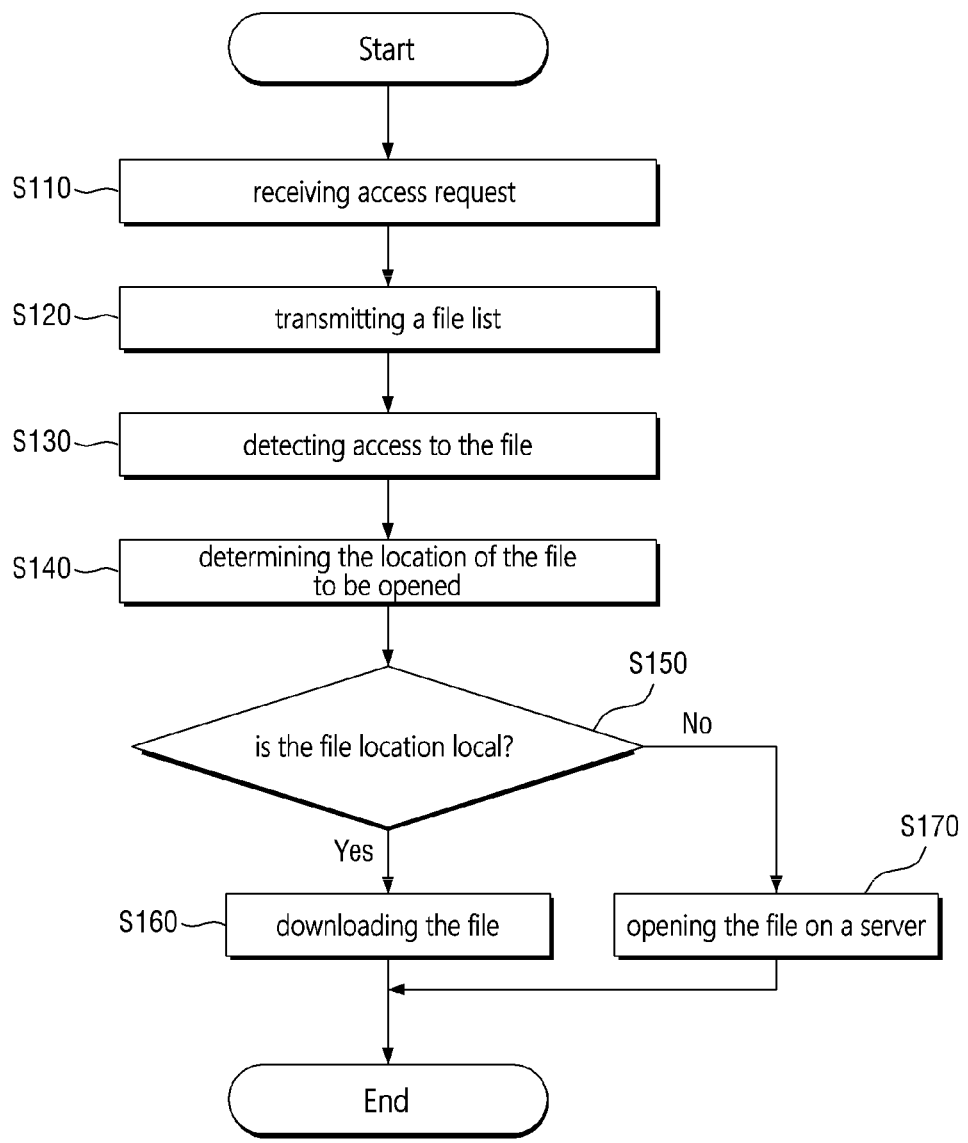
FIG. 2 is a flowchart illustrating a method for managing a file according to the other embodiment of the present disclosure.

FIG. 2 is a flowchart illustrating a method for managing a file according to the other embodiment of the present disclosure.

Each step of the method illustrated in FIG. 2 may be performed by the computing device. In other words, each step of the present method may be implemented with one or more instructions executed by a processor of the computing device. First steps included in the present method may be performed by a first computing device, and second steps of the present method may be performed by a second computing device. Hereinafter, a further description will be continued assuming that each step of the present method is performed by the file management server 1 described with reference to FIG. 1; however, the subject of performing each step is only an example, and the present disclosure is not limited to the following description. For the convenience of explanation, the description of the subject of performing some steps included in the method may be omitted.

Referring to FIG. 2, the file management server 1 may receive an access request from the user terminal 2 (S110). Subsequently, the file management server 1 may transmit a file list included in the network drive to the user terminal 2 (S120). In one embodiment, after receiving authentication information (e.g., ID and a password) from the user terminal 2, the file management server 1 may perform user authentication based on the authentication information. When the authentication is completed, the file management server 1 may transmit the file list to the user terminal 2. In some embodiments, the file management server 1 may identify the network driver that corresponds to the user's identification information (e.g., ID), and transmit the file list included in the network drive to the user terminal 2.

In addition, the file management server 1 may detect access to any one of the transmitted file lists by the user terminal 2 (S130). For instance, the user terminal 2 may select any one of the file lists, and in this case, the file management server 1 may detect access to the selected file.

Next, the file management server 1 may determine a location where the file for which access is detected is to be opened (S140). Determining the location where the file is to be opened may be based on at least one of the cumulative number of storages of the file, the cumulative number of storages of the user, current time, the number of available resources of the server, user information, a department to which the user belongs, a security level of the file, size of the file, or a state of the network between the file management server 1 and the user terminal 2. A variety of embodiments for determining the location where the file is to be opened will be described in more detail with reference to FIGS. 3 to 10.

In addition, the file management server 1 may process the file to be downloaded to the user terminal 2 in response to a determination that the location where the file is to be opened is local (Yes in S150). The file downloaded on the user terminal 2 may be opened using resources of the user terminal 2.

The file management server 1 may open the file and then provide the content of the opened file to the user terminal in response to the determination that the location where the file is to be opened is remote (No in S150). In one embodiment, the file management server 1 may open the file using the resources of the file management server 1. In some embodiments, when the content of the file opened by the file management server 1 are transmitted to the user terminal 2, the user interface capable of editing the content of the opened file may be displayed on the user terminal 2, and the user may edit the content of the file using the user interface. When a storage operation for the file (i.e., the file opened in the server) takes place on the user interface displayed on the user terminal 2, the file management server 1 may update the file by reflecting the content edited on the user terminal 2. For example, when the user selects the Save menu after editing the file opened in the remote location, the storage operation takes place, and accordingly, the file management server 1 may update the file by reflecting the content edited on the user terminal 2.

According to the present embodiment, the file may be opened in either the server or terminal, thereby reducing the server load in comparison to the conventional art capable of opening the file only in the server.

Hereinafter, a variety of embodiments of the step S140 described with reference to FIG. 2 will be described.

Figure 3:
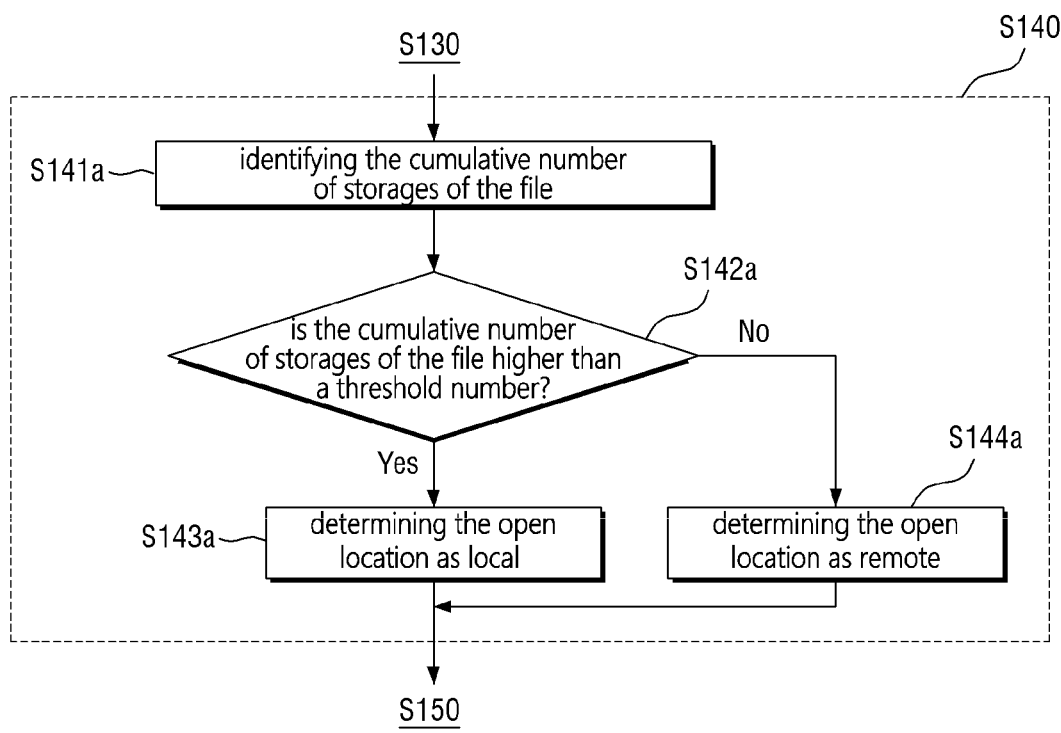
FIGS. 3 to 11 are views illustrating a variety of embodiments for a step S140 with reference to FIG. 2.

Referring to FIG. 3, the file management server 1 may identify the cumulative number of storages that a storage operation takes place for the file (141a). In detail, the file management server 1 may identify how often the file is stored based on the storage operation of the file. In one embodiment, the file management server 1 may count the storage operations generated for each file to store the cumulative number of storages for each file, and may identify the cumulative number of storages of the file based on the cumulative number of storages of each stored file. To this end, when the storage operation for a specific file takes place, the file management server 1 may increase the cumulative number of storages of the corresponding file.

In addition, the file management server 1 may determine whether the cumulative number of storages of the identified file is higher than a threshold number (S142a). Next, as a determination result of the step S142a, when the cumulative number of storages of the file is higher than the threshold number, the file management server 1 may determine the location where the file is to be opened as local (S143a). In other words, when the cumulative number of storages of the file is higher than the threshold number, the file may be expected to be frequently edited, which causes the storage operation to take place frequently. Accordingly, when the file is opened remotely, the file management server 1 may be expected to be heavily overloaded. In order to reduce the load while editing the file, the file management server 1 may determine the location where the file is to be opened as local when the cumulative number of storages of the file is higher than the threshold number.

On the other hand, as the determination result of the step S142a, when the cumulative number of storages for the file is less than or equal to the threshold number, the file management server 1 may determine the location where the file is to be opened as remote (S144a). In detail, when the cumulative number of storages for the file is less than or equal to the threshold number, the storage operation for the file rarely takes place, and, therefore, the file management server 1 may not be expected to be at overload even when the file is opened using the resources of the file management server 1. Based on such an expectation, when the cumulative number of storages of the file is less than or equal to the threshold number, the location where the file is to be opened may be determined as remote.

According to the present embodiment, the file that causes the sever to be overloaded at the time of editing the file may be made to be opened locally based on the cumulative number of storages of the file, thereby previously preventing the server from being overloaded generated by frequently opening of the stored file in the server.

Hereinafter, another embodiment of the step S140 described with reference to FIG. 4 will be described.

Figure 4:
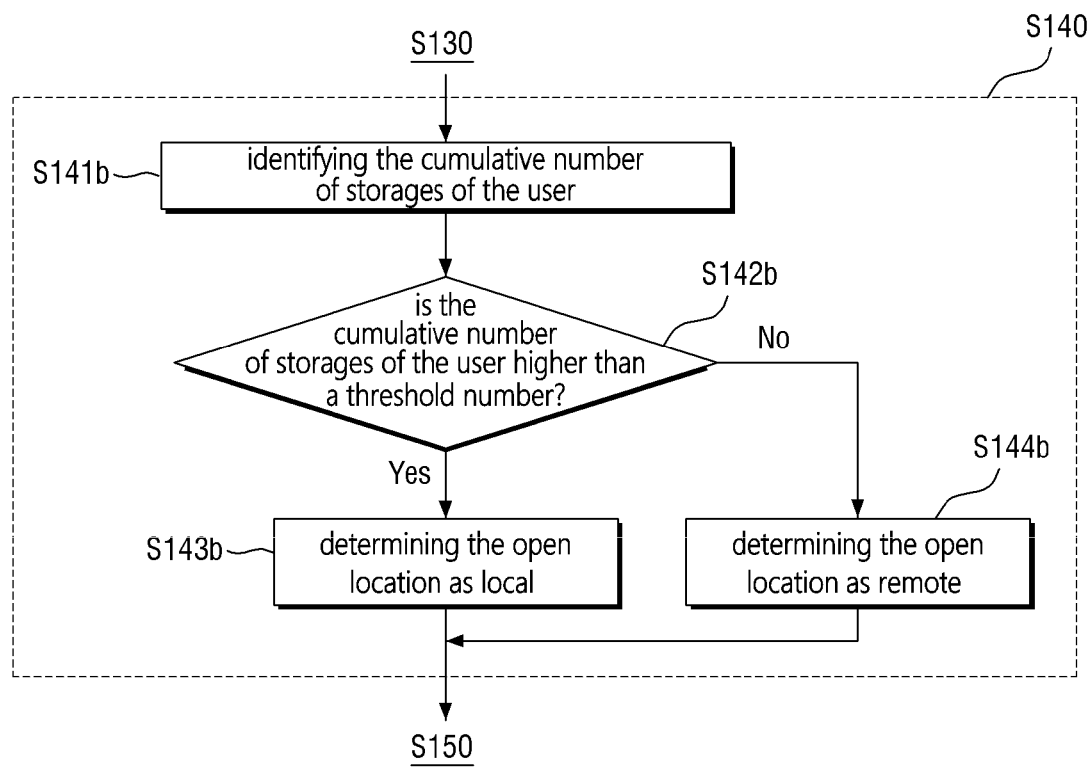

Referring to FIG. 4, the file management server 1 may identify the cumulative number of times of storages of the user, which is indicative of the sum of the storage operations of each file generated by the user (S141b). In other words, the file management server 1 may identify the cumulative number of storage operations that take place in a plurality of files by the user. In addition, the file management server 1 may determine how often the user generates storage operations based on the cumulative number of storages. In one embodiment, the file management server 1 may store the cumulative number of storages for each user by counting the storage operations generated by each user, and may identify the cumulative number of storages of the user based on the stored cumulative number of storages of each user. To this end, when the storage operation takes place by a specific user, the file management server 1 may increase the cumulative number of storages of the corresponding user.

In addition, the file management server 1 may determine whether the cumulative number of storages for the identified user is higher than the threshold number (S142b). Next, as a determination result of the step S142b, when the cumulative number of storages of the identified user is higher than the threshold number, the file management server 1 may determine the location where the file is to be opened as local (S143b). In detail, when the cumulative number of storages for the user is higher than the threshold number, the storage operations may be expected to frequently take place by the user. Accordingly, when the file is open remotely, the file management server 1 may be expected to be overloaded. In order to reduce the server load caused by the storage operations frequently generated by the user, the file management server 1 may determine the location where the file is to be opened as local when the cumulative number of storages for the user is higher than the threshold number.

On the other hand, as the determination result of the step S142b, when the cumulative number of storages for the identified user is less than or equal to the threshold number, the file management server 1 may determine the location where the file is to be opened as remote (S144b). In detail, when the cumulative number of storages for the user is less than or equal to the threshold number, the storage operation for the file rarely takes place by the user, and, therefore, the file management server 1 may not be expected to be at overload even when the file is opened using the resources of the file management server 1. Based on such an expectation, when the cumulative number of storages of the file is less than or equal to the threshold number, the location where the file is to be opened may be determined as remote.

According to the present embodiment, based on the cumulative number of storages of the user, the user's file causing the server overload upon editing the file may be opened locally, thereby previously preventing a server from being overloaded by the user that frequently generates the storage operations.

Hereinafter, another embodiment of the step S140 described with reference to FIG. 5 will be described.

Figure 5:
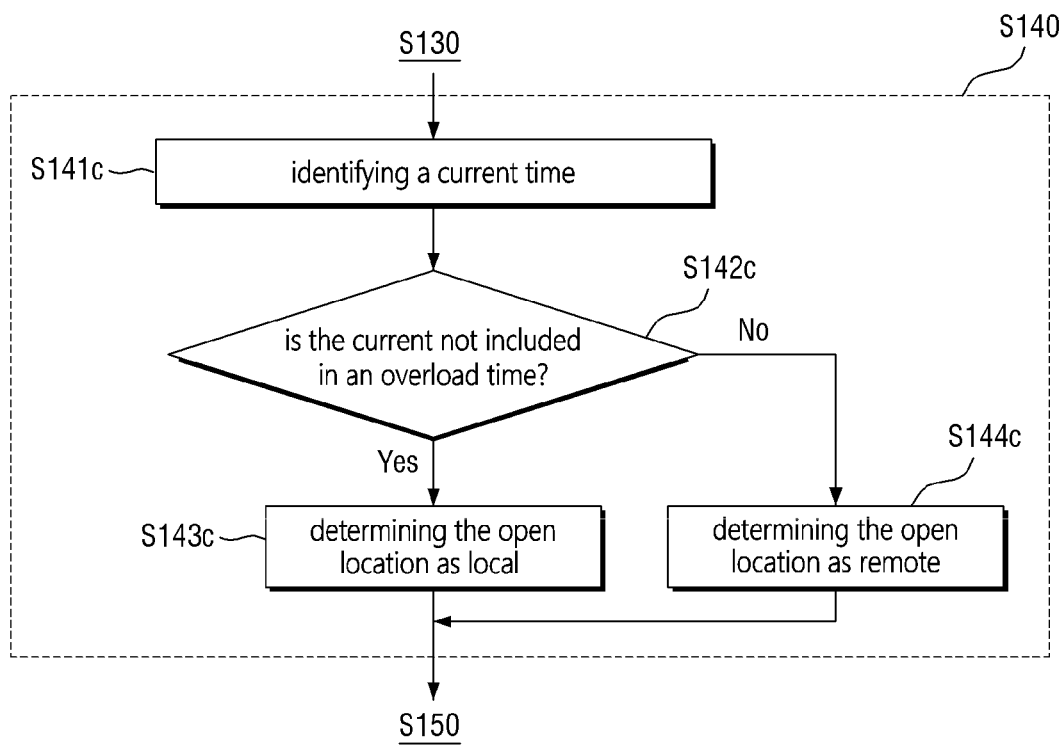

Referring to FIG. 5, the file management server 1 may identify the current time (141c). In other words, the file management server 1 may identify the current time when detecting access to the file.

In addition, the file management server 1 may determine whether the identified current time is included in an overload time (S142c). The overload time may be set in advance. For instance, the overload time may be set in a time zone during the hours of operation from 9 a.m. to 10 a.m.

In addition, as a determination result of the step S142c, when the current time is included in the overload time, the location where the file is to be opened may be determined as local (S143c). In detail, when the current time is included in the overload time, it may be expected that the resources of the file management server 1 are insufficient and its performance is lowered due to heavy traffic. In this case, when the file is opened remotely, the file management server 1 may be further overloaded. In order to reduce the overload of the server at the overload time, when the current time is included in the overload time, the file management server 1 may determine the location where the file is to be opened as local.

On the other hand, when the identified current time is not included in the overload time, the file management server 1 may determine the location where the file is to be opened as remote (S144*c*). In detail, when the current time is not included in the overload time, the resources of the file management server 1 are so sufficient that the file may be opened at a undegraded speed and the editing events may be processed. Accordingly, when the current time is not included in the overload time, the file management server 1 may determine the location where the file is to be opened as remote.

According to the present embodiment, when the time of accessing the file is an overload time, the location where the file is to be opened may be determined as local, thereby distributing the traffic during the overload time and reducing the load of the file management server 1 during the overload time.

Hereinafter, another embodiment of the step S140 described with reference to FIG. 6 will be described.

Figure 6:
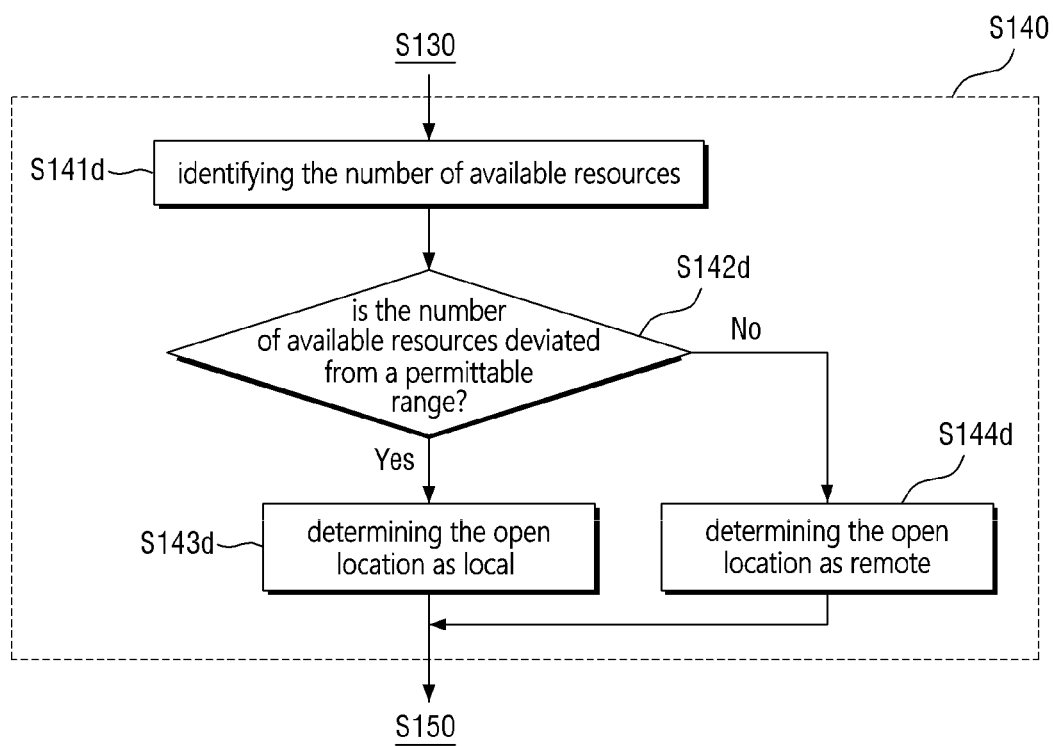

Referring to FIG. 6, the file management server 1 may identify the amount of currently available resources (141*d*). That is, the file management server 1 may recognize the amount of available resources including available CPU resources, available memory resources, and available network resources. The file management server 1 may identify the amount of available resources by monitoring CPU usage, memory usage, and network traffic in real time. In the other embodiment, the file management server 1 may identify the amount of available resources of the file management server 1. In another embodiment, the file management server 1 may identify the amount of available resources of a file storage server (not illustrated in the drawings). In detail, when the network driver is provided to the user terminal 2 by the file storage server, the file management server 1 may identify the amount of available resources of the file storage server. In that case, the file management server 1 may request the amount of available resources to the file storage server and receive the amount of available resources from the file storage server.

In addition, the file server management 1 may determine whether or not the identified amount of available resources is included within permittable range (S142*d*). The permittable range may include at least one of a memory permittable range, a CPU permittable range, or a network traffic permittable range. In this case, the file server management 1 may determine whether at least one of the amount of available resources of the CPU, the amount of available resources of the memory, or the amount of available network traffic is included in the permittable range.

In addition, a determination result of the step S142*d*, when the amount of available resources is not included in the permittable range, the location where the file is to be opened may be determined as local (S143*d*). In detail, when the amount of available resources is not included in the permittable range, it may be expected that the resources of the file management server 1 may be insufficient, or its performance may be lowered due to heavy traffic; therefore, the file management server may be more overloaded when the file is opened and edited in the remote location. Accordingly, when there is an insufficient amount of available resources, the file management server 1 may determine the location where the file is to be opened as local in order to handle the file in the local location.

On the other hand, as the determination result of the step S142*d*, when the amount of available resources is included in the permittable range, the file management server 1 may determine the location where the file is to be opened as remote (S144*d*). In detail, when the amount of available resources is included within the permittable range, the resources of the file management server 1 are so sufficient that the file may be handled at the undegraded speed by the file management server 1. Accordingly, when the amount of available resources is included within the permittable range, the file management server 1 may determine the location where the file is to be opened remote.

According to the present embodiment, when there is the insufficient amount of available resources of the server, the location where the file is to be opened may be determined as local, thereby reducing the traffic on the server and the server load. In addition, it is possible to prevent the loss of the edited content of the file that is caused by the server overload.

Hereinafter, another embodiment of the step S140 described with reference to FIG. 7 will be described.

Figure 7:
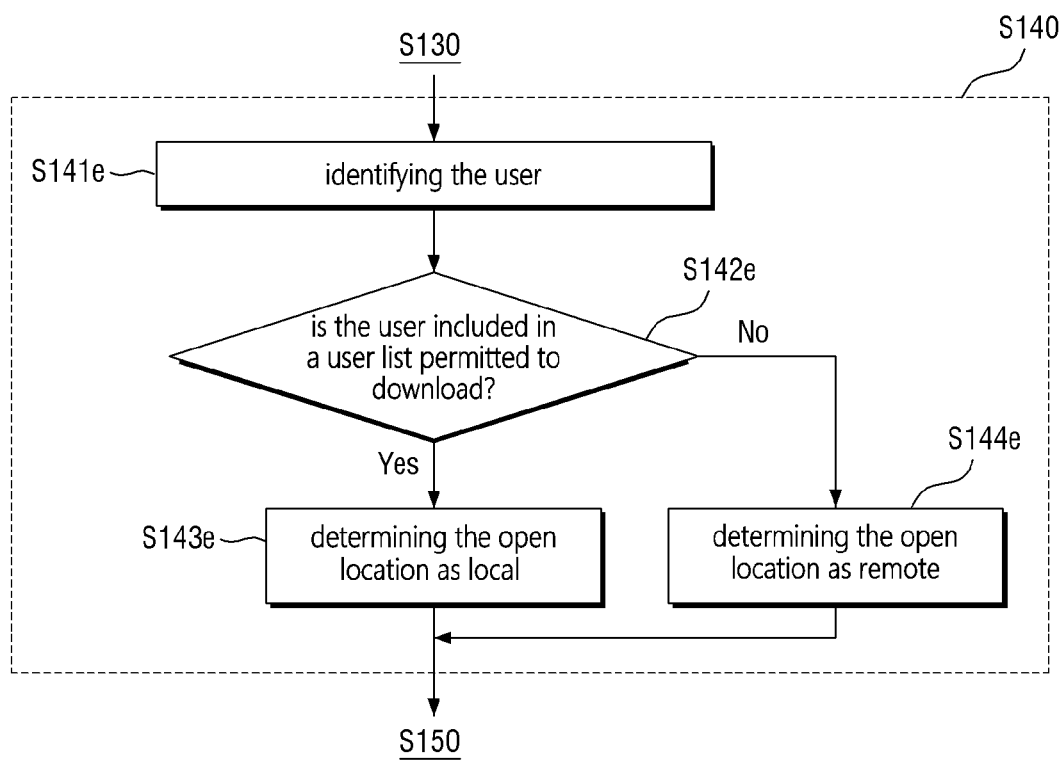

Referring to FIG. 7, the file management server 1 may identify the user (S141*e*). In one embodiment, the file management server 1 may identify the user based on the user's login ID.

In addition, the file management server 1 may determine whether the identified user is included in a user list permitted to download (S142*e*). The user list may be managed by an administrator, and users capable of complying with security may be included in the user list.

In addition, as a determination result of the step S142*e*, when the identified user is included in the user list, the location where the file is to be opened may be determined as local (S143*e*).

On the other hand, as the determination result of the step S142*e*, when the identified user is not included in the user list, the file management server 1 may determine the location where the file is to be opened as remote (S144*e*).

According to the present embodiment, since the open location of the file may be determined as local only for a permitted user, the significant files may be prevented from being stored in a terminal of a non-permitted user, thereby improving security of the file.

Hereinafter, another embodiment of the step S140 described with reference to FIG. 8 will be described.

Figure 8:
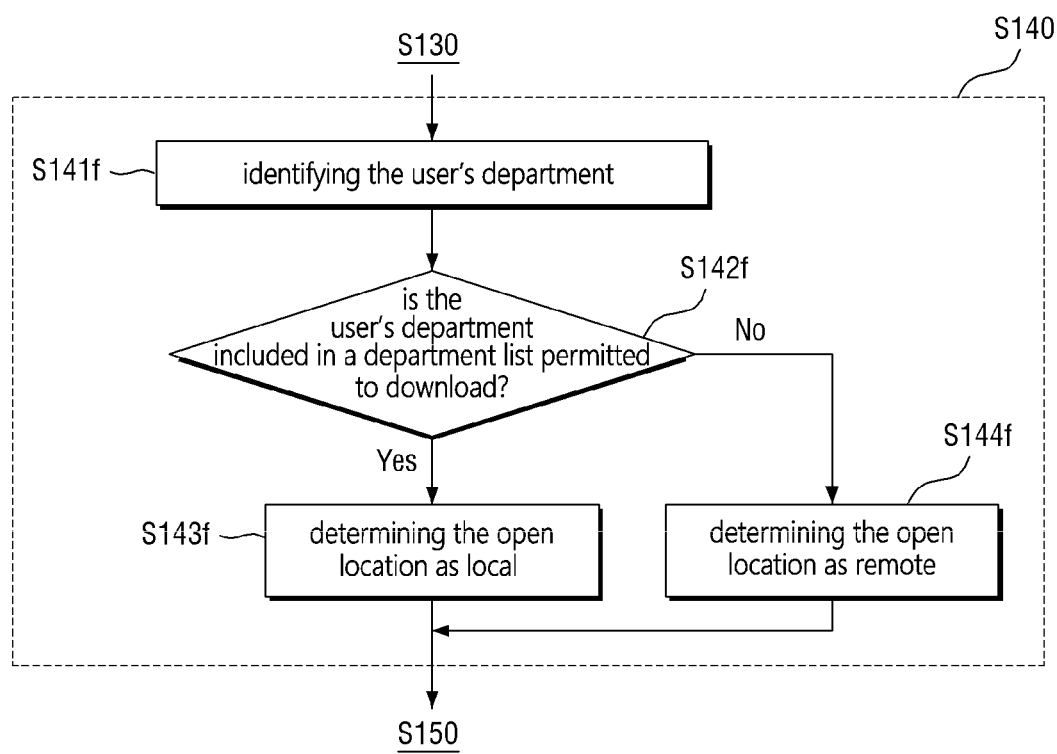

Referring to FIG. 8, the file management server 1 may identify the department to which the user belongs (S141*f*). In one embodiment, the file management server 1 may identify the department to which the user belongs from pre-stored user information.

In addition, the file management server 1 may determine whether the identified user department is included in a department list permitted to download (S142*f*). The department list may be managed by an administrator, and departments capable of complying with security may be included in the user list.

In addition, as a determination result of the step S142*f*, when the identified user department is included in the department list, the location where the file is to be opened may be determined as local (S143*f*).

On the other hand, as the determination result of step S142*f*, when the identified user department is not included in the department list, the file management server 1 may determine the location where the file is to be opened as remote (S144*f*).

According to the present embodiment, since the open location of the file may be determined as local only for a permitted department, the significant files may be prevented from being stored in a terminal of a member in a non-permitted department, thereby improving security of the file.

Hereinafter, another embodiment of the step S140 described with reference to FIG. 9 will be described.

Figure 9:
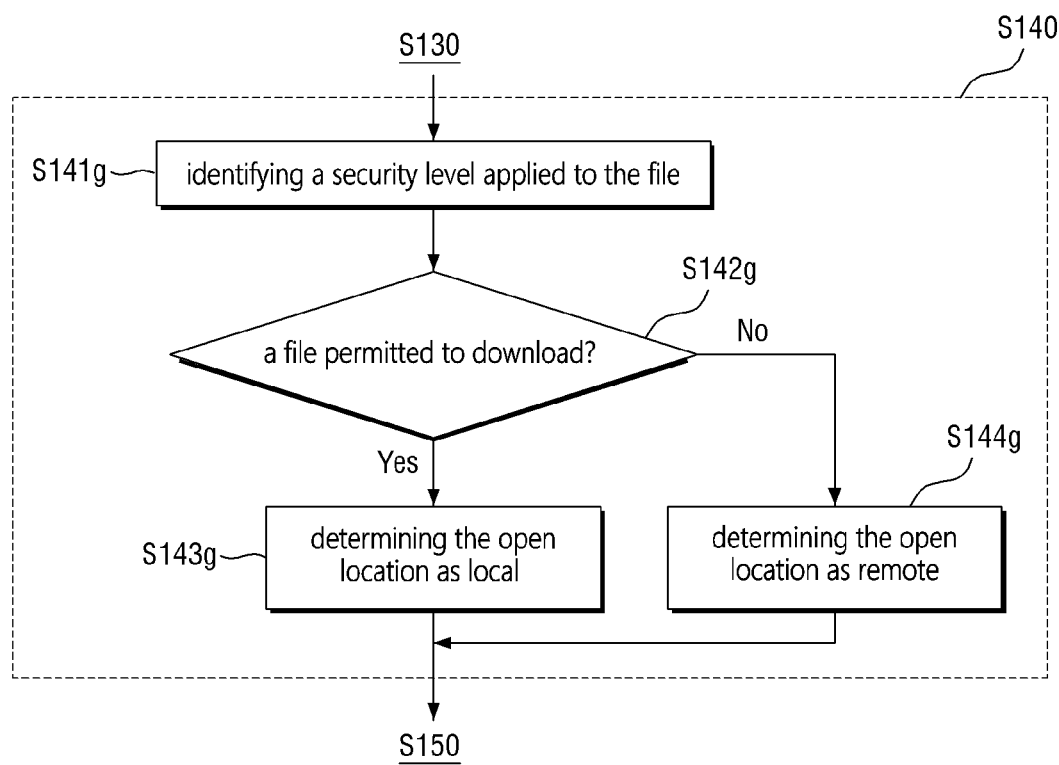

Referring to FIG. 9, the file management server 1 may identify a security level applied to the file (S141g). The security level of the file may be determined based on at least one of a level of the department to which the user belongs, the user's rank, or the number of compliance violation keywords included in the file. Herein, the compliance may include at least one of in-house rules, a law, or security policy that the user shall observe. In one embodiment, the file management server 1 may identify the user and confirm the user's assigned rank. For example, the user's rank may be determined as any one of the first to fifth ranks, and the lower rank of the user may allow a higher security level to be applied to the file. In addition, the file management server 1 may identify the department to which the user belongs and the rank of the department. For example, the department rank may be determined as any one of the first to fifth ranks, and lower level of the department may allow a higher security level to be applied to the file. Moreover, the file management server 1 may store a violation keyword list including a plurality of compliance violation keyword. When the violation keyword list is compared with a text in the file, the file management server 1 may count the number of compliance violation keywords in the file. The violation keyword list may be generated in advance and registered in the file management server 1. With an increase of the number of violation keywords, a higher security level may be applied to the file.

In some embodiments, the file management server 1 may weight each user's rank, the rank of the user's department, and the number of compliance violation keywords included in the file. The file management server 1 may determine the security level applied to the file based on the user's weighted rank, the weighted rank of the user's department, and the weighted number of compliance violation keywords included in the file.

Next, the file management server 1 may determine whether or not the file is a file permitted to download based on the identified security level (S142g). The security level may be classified into several grades. In detail, when the security level is less than or equal to a predetermined level, the file may be determined as the file permitted to download. In other words, a file having a relatively low security level may be determined as the file permitted to download, and a file having a relatively high security level may be determined as a file not permitted to download.

In addition, as a determination result of the step S142g, when the file is determined as the file permitted to download, the file management server 1 may determine the location where the file is to be opened as local (S143g).

On the other hand, as a determination result of the step S142g, when the file is not determined as a file permitted to download, the file management server 1 may determine the location where the file is to be opened as remote (S144g).

According to the present embodiment, the file having the relatively low security level is permissible to download, and the file having a high security level is made to be opened only in the remote location, thereby improving file security and preventing exposure of the significant files.

Hereinafter, another embodiment of the step S140 described with reference to FIG. 10 will be described.

Figure 10:
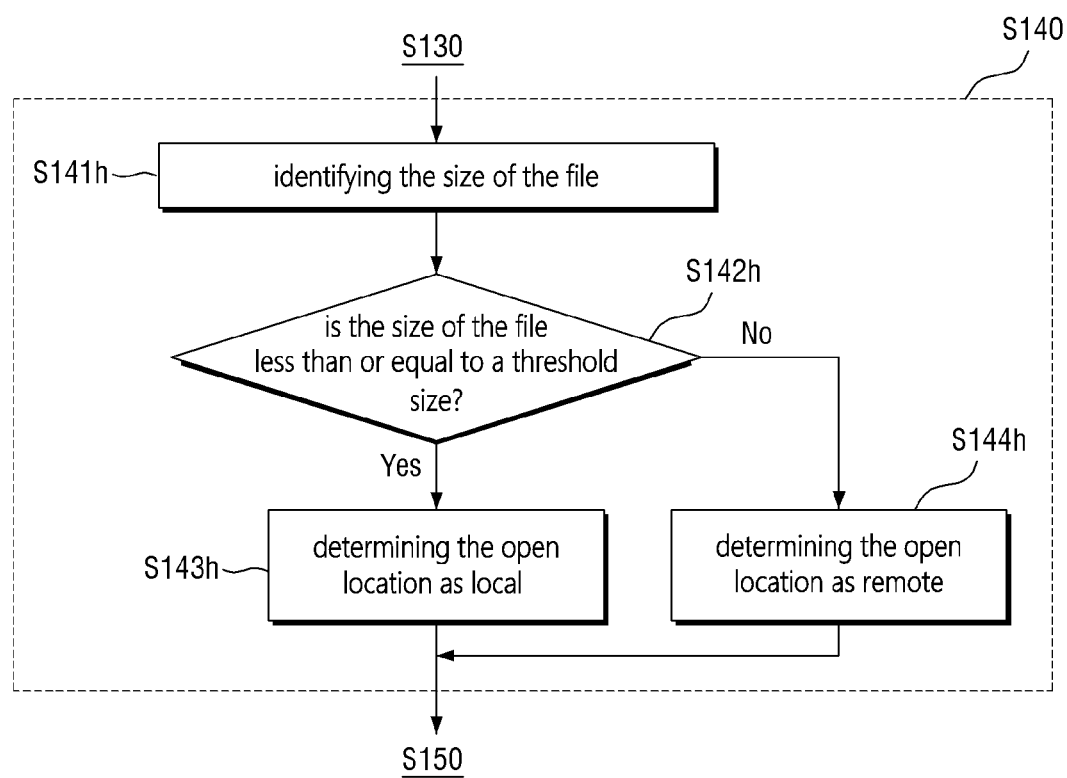

Referring to FIG. 10, the file management server 1 may identify the size of the file (S141h).

In addition, the file management server 1 may determine whether the identified size of the file is less than or equal to a pre-set threshold size (S142h).

As a determination result of the step S142h, when the identified size of the file is less than or equal to a threshold size, the location where the file is to be opened may be determined as local (S143h). In detail, for the file having small size, a small amount of server traffic and other resources (CPU, memory, etc.) may be determined to be necessary at the time of downloading the file so that the location where the file is to be opened may be determined as local.

On the other hand, as a determination result of the step S142h, when the identified size of the file is higher than the threshold size, the file management server 1 may determine the location where the file is to be opened as remote (S144h). In detail, for the file having large size, a large amount of server traffic and other resources (CPU, a memory, etc.) may be determined to be necessary at the time of downloading the file so that the location where the file is to be opened may be determined as remote.

According to the present embodiment, for the file having large size, the open location of the file may be determined as remote, thereby preventing an increase in a server load in advance at the time of transmitting the file having the large size the server to the terminal.

Hereinafter, another embodiment of the step S140 described with reference to FIG. 11 will be described.

Figure 11:
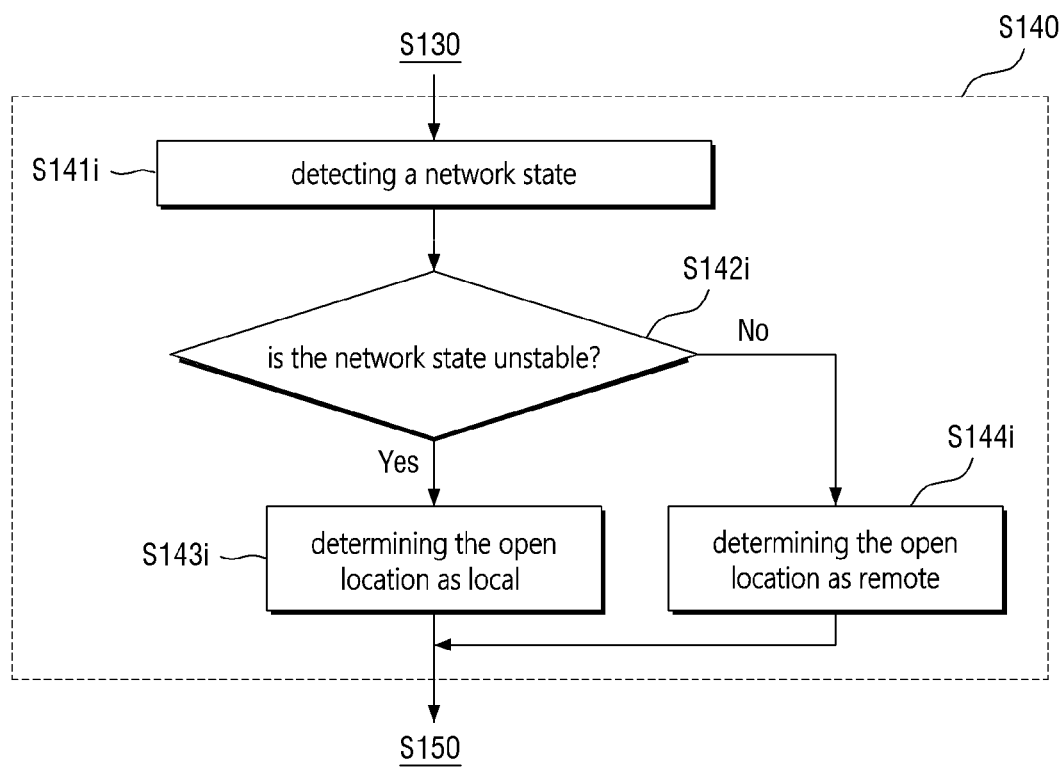

Referring to FIG. 11, the file management server 1 may detect a network state in connection with the user terminal 2 (S141i). In one embodiment, the file management server 1 may detect the network state based on a packet delay and a packet loss rate that are generated in the network.

In addition, the file management server 1 may determine whether the detected network state is unstable or stable (S142i). When the packet delay of the network is higher than a predetermined time, or the packet loss rate is higher than a predetermined value, the network state may be determined to be unstable.

In addition, as a determination result of step S142i, when the detected network state is unstable, the location where the file is to be opened may be determined as local (S143i). In detail, when the file is opened in the server in the remote location (i.e., the file management server) in an unstable network state and the opened file is edited in the remote location, the events associated with the editing may not be properly transmitted from the user terminal 2 to the file management server 1. In this case, since an editing state of the file is not immediately reflected in the file management server 1, an intermediate editing process may be lost. Alternatively, it is beneficial for the user terminal 2 to download the file, open the file in the local location and edit the file using local resources. In consideration of such situation, when the network state is unstable, the location where the file is to be opened may be determined as local.

Meanwhile, as a determination result of step S142i, when the detected network state is stable, the file management server 1 may determine the location where the file is to be opened as remote (S144i).

According to the present embodiment, when the network is unstable, the open location of the file may be determined as local, thereby preventing the editing events transmitted from the terminal to the server from being lost when the file is opened via a remote server in the unstable network state.

Hereinafter, a method of handling a file in the case of closing the edited file will be described with reference to FIG. 12.

Figure 12:
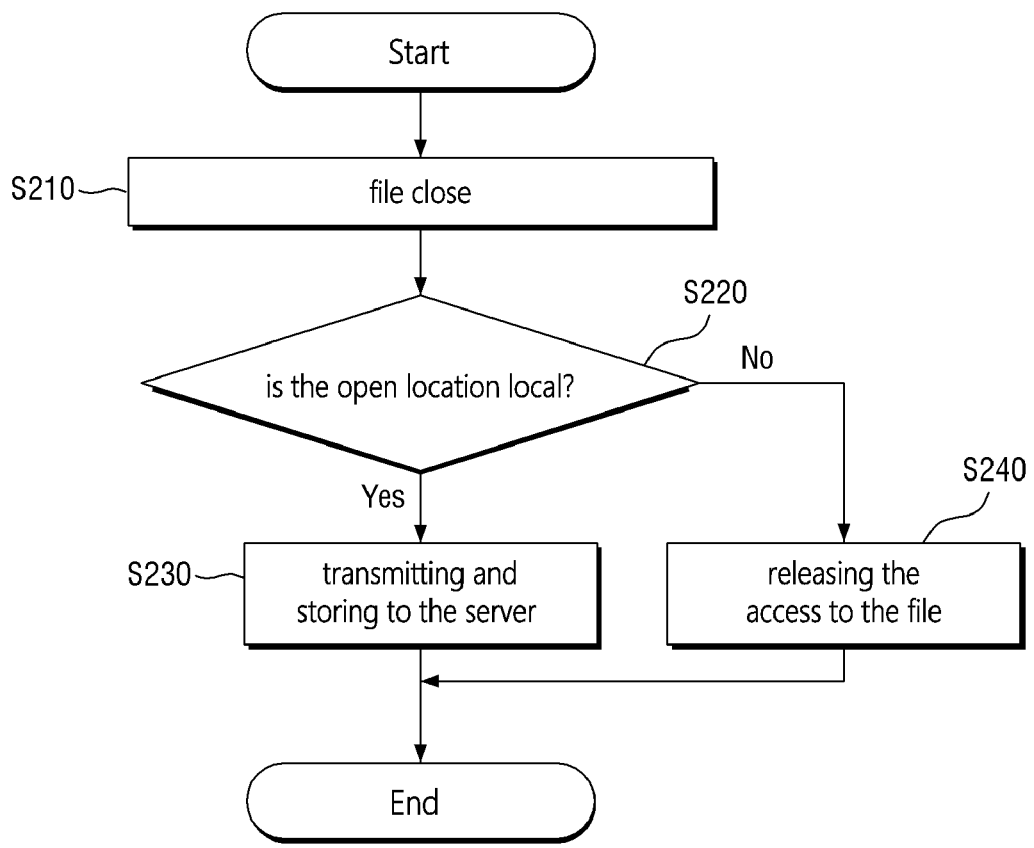
FIG. 12 is a flowchart illustrating a method for managing a file according to another embodiment of the present disclosure.

Each step of the method illustrated in FIG. 12 may be performed by the computing device. In other words, each step of the present method may be implemented with one or more instructions executed by the processor of the computing device. The first steps included in the present method may be performed by the first computing device, and the second steps of the present method may be performed by the second computing device. Hereinafter, the description is continued assuming that each step of the present method is performed by the user terminal 2 or an agent installed in the user terminal 2 described with reference to FIG. 1; however, the subject of performing each step is only an example, and the present disclosure is not limited to the following description. For the convenience of explanation, the description of the subject of performing some steps included in the present method may be omitted.

Referring to FIG. 12, the user terminal 2 may close the file after completing the editing of the file (S210). In addition, the user terminal 2 may determine whether the open location of the file is local or remote (S220).

As a determination result of the step S220, when the open location is local, the user terminal 2 may transmit the edited file to the file management server 1 (S230). The file is an updated file compared to the downloaded file, and the user terminal 2 may transmit the updated file to the file management server 1. In this case, the file management server 1 may receive the updated file from the user terminal 2 and replace the file stored in the remote location (i.e., a network drive) with the updated file.

Meanwhile, as the determination result of the step S220, when the open location is remote, a file close event may be transmitted to the file management server 1, resulting in releasing the access to the file (S240). The file management server 1 receiving the closed file event may close the opened file and recover the resources input to the file.

According to the present embodiment, the file edited in the local location may be transmitted to the file management server 1, after completing the editing, and may be stored in the remote location.

Hereinafter, another embodiment of handling the file in the user terminal with reference to FIG. 13 will be described.

Figure 13:
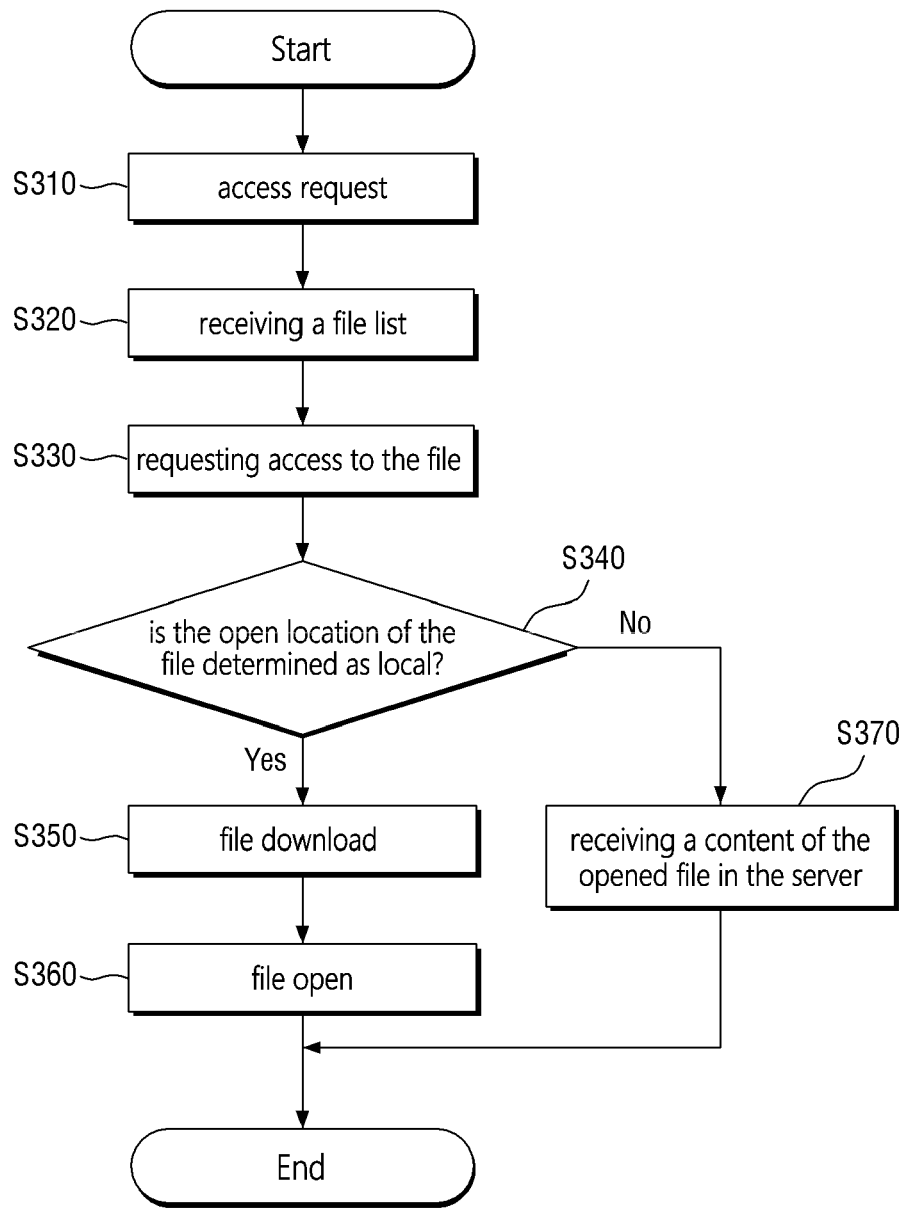
FIG. 13 is a flowchart illustrating a method for managing a file according to another embodiment of the present disclosure.

Each step of the method illustrated in FIG. 13 may be performed by the computing device. In other words, each step of the present method may be implemented with one or more instructions executed by the processor of the computing device. The first steps included in the present method may be performed by the first computing device, and the second steps of the present method may be performed by the second computing device. Hereinafter, the description is continued assuming that each step of the present method is performed by the user terminal 2 or an agent installed in the user terminal 2 described with reference to FIG. 1; however, the subject of performing each step is only an example, and the present disclosure is not limited to the following description. For the convenience of explanation, the description of the subject of performing some steps included in the method may be omitted.

Referring to FIG. 13, the user terminal 2 may request access to the file management server 1 (S310). In one embodiment, the user terminal 2 may request access by transmitting authentication information (e.g., ID and a password) to the file management server 1.

When the authentication succeeds (is completed), the user terminal 2 may receive the file list included in the network drive from the file management server 1 (S320). Thereafter, any one of the files may be selected from the user list by the user, and the user terminal 2 may request access to the selected file to the file management server 1 (S330).

In addition, the open location of the file requested for access may be determined by the file management server 1 (S340). In response to the determination that the location where the file is to be opened is local, the user terminal 2 may download the file from the file management server 1 (S350). Then, when the file has been downloaded, the user terminal 2 may open the file using the local resources (i.e., resources of the user terminal) (S360).

As a determination result of the S40, when the location where the location is to be opened is remote, the file may be opened using the resources in the remote location (i.e., the resources of the file management server), and the user terminal 2 may receive the content of the file opened by the file management server 1 from the file management server 1 (S370).

Figure 14:
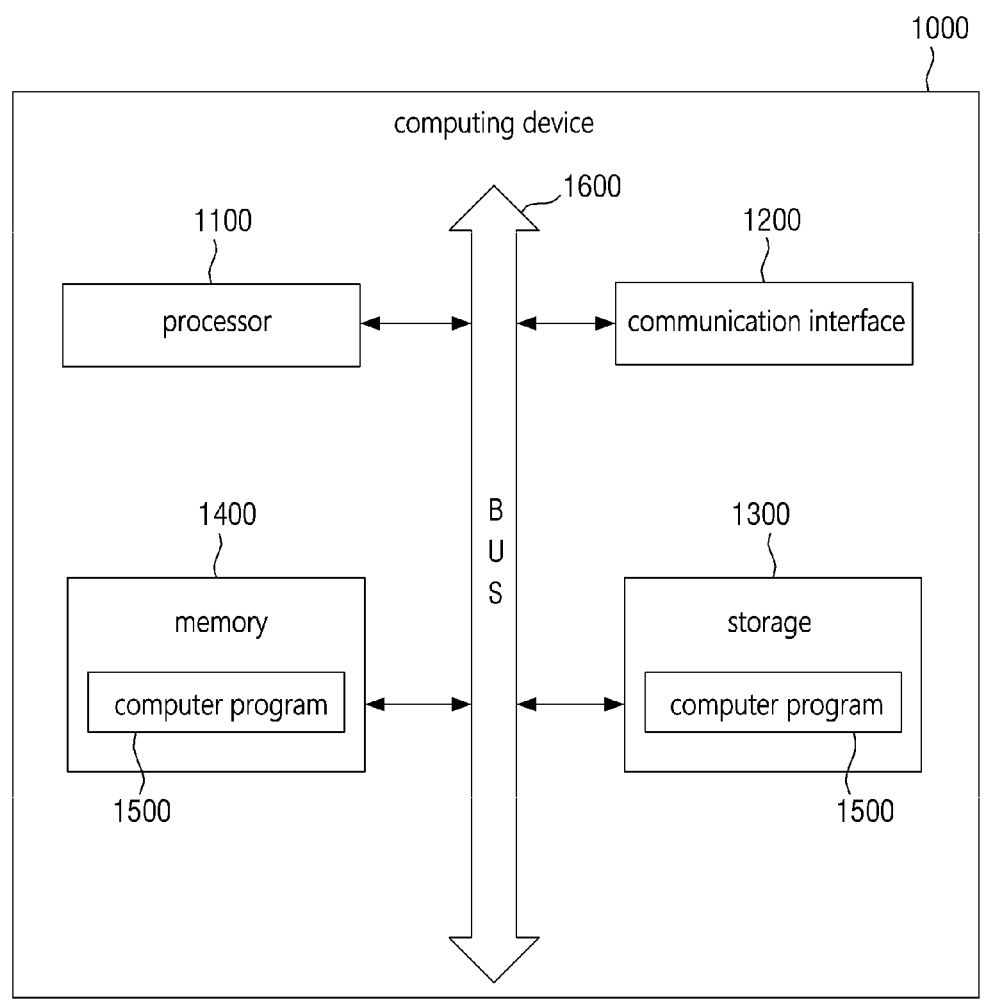
FIG. 14 is an exemplary view illustrating a hardware configuration that can implement a computing device in a variety of embodiments.

FIG. 14 is an example hardware diagram illustrating a computing device 1000. For example, a computing device 1000 depicted in FIG. 14 may be a hardware device which implement the data management device 2 depicted in FIG. 1.

As shown in FIG. 14, the computing device 1000 may include one or more processors 1100, a bus 1600, a communication interface 1200, a memory 1400, which loads a computer program 1500 executed by the processors 1100, and a storage 1300 for storing the computer program 1500. However, FIG. 14 illustrates only the components related to the embodiment of the present disclosure. Therefore, it will be appreciated by those skilled in the art that the present disclosure may further include other general purpose components in addition to the components shown in FIG. 14.

The processor 1100 controls overall operations of each component of the computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1100 may perform calculations on at least one application or program for executing a method/operation according to various embodiments of the present disclosure. The computing device 1000 may have one or more processors.

The memory 1400 stores various data, instructions and/or information. The memory 1400 may load one or more programs 1500 from the storage 1300 to execute methods/operations according to various embodiments of the present disclosure. An example of the memory 1400 may be a RAM, but is not limited thereto.

The bus 1600 provides communication between components of the computing device 1000. The bus 1600 may be implemented as various types of bus such as an address bus, a data bus and a control bus.

The communication interface 1200 supports wired and wireless internet communication of the computing device 1000. The communication interface 1200 may support various communication methods other than internet communication. To this end, the communication interface 1200 may be configured to include a communication module well known in the art of the present disclosure.

The storage 1300 can non-temporarily store one or more computer programs 1500. The storage 1300 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1500 may include one or more instructions, on which the methods/operations according to various embodiments of the present disclosure are implemented. For example, the computer program 1500 may include instructions for executing operations including detecting an attempt for a user terminal to access the file stored in the remote location and determining a location where the file attempted to be access is to be opened.

When the computer program 1500 is loaded on the memory 1400, the processor 1100 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for managing access to a file stored in a remote location, the method comprising:
    detecting an attempt for a user terminal to access the file stored in the remote location;
    determining a location where the file attempted to be access is to be opened;
    in response to a determination that the location where the file is to be opened is remote, opening the file and providing a content of the opened file to the user terminal by a file management server; and
    in response to a determination that the location where the file is to be opened is local, processing the file to be downloaded to the user terminal by the file management server,
    wherein the determining of the location where the file is to be opened comprises:
    detecting a state of a network between the remote location and the user terminal; and
    when the state of the network is determined to be stable, determining the location where the file is to be opened as remote, and when the state of the network is determined to be unstable, determining the location where the file is to be opened as local.

2. The method of claim 1, wherein the determining of the location where the file is to be opened comprises:
    identifying cumulative number of storages that a storage operation launches for the file; and
    when the cumulative number of storages is less than or equal to a threshold number, determining the location where the file is to be opened as remote, and when the cumulative number of storages is higher than a threshold number, determining the location where the file is to be opened as local.

3. The method of claim 1, wherein the determining of the location where the file is to be opened comprises:
    identifying cumulative number of storages that is indicative of the sum of storage operations of each file generated by a user; and
    when the cumulative number of storages is less than or equal to a threshold number, determining the location where the file is to be opened as remote, and when the cumulative number of storages is higher than the threshold number, determining the location where the file is to be opened as local.

4. The method of claim 1, wherein the determining of a location where the file is to be opened comprises:
    determining the location where the file is to be opened;
    identifying a current time; and
    when the current time is not included in a preset overload time, determining that the location where the file is to be opened as remote, and when the current time is included in the overload time, determining the location where the file is to be opened as local.

5. The method of claim 1, wherein the determining of the location where the file is to be opened comprises:
    identifying an amount of available resources of the file management server or a file storage server of the remote location; and
    when the amount of available resources is within a permittable range, determining the location where the file is to be opened as remote, and when the amount of available resources is deviated from the permittable range, determining the location where the file is to be opened as local.

6. The method of claim 1, wherein the determining of the location where the file is to be opened comprises:
    identifying a user; and
    when the identified user is not included in a user list permitted to download, determining the location where the file is to be opened as remote, and when the identified user is included in the user list permitted to download, determining the location where the file is to be opened as local.

7. The method of claim 1, wherein the determining of the location where the file is to be opened comprises:
    identifying a department to which the user belongs; and
    when the department is not included in a department list permitted to download, determining the location where the file is to be opened as remote, and when the department is included in the department list permitted to download, determining the location where the file is to be opened as local.

8. The method of claim 1, wherein the determining of the location where the file is to be opened comprises:
    identifying a security level applied to the file; and
    identifying whether the file is a file permitted to download, based on the identified security level, and when the file is a file not permitted to download, determining the location where the file is to be opened as remote, and when the file is the file permitted to download, determining the location where the file is to be opened as local.

9. The method of claim 8, wherein the security level of the file is based on at least one of a rank of the department to which the user belongs, a rank of the user, or the number of compliance violation keywords included in the file.

10. The method of claim 1, wherein the determining of the location where the file is to be opened comprises:
identifying a size of the file; and
when the identified size of the file is higher than a threshold size, determining the location where the file is to be opened as remote, and when the identified size of the file is less than or equal to the threshold size, determining the location where the file is to be opened as local.

11. The method of claim 1, wherein the providing of the content of the opened file to the user terminal comprises:
opening the file using resources of the file management server; and
displaying the opened file to the user terminal by an editable user interface.

12. The method of claim 1, wherein the providing of the content of the opened file to the user terminal comprises:
when a storage operation for the file takes place on the user interface, updating the file by reflecting an edited content on the user terminal by the server management server.

13. The method of claim 1, further comprising:
opening the downloaded file by the user terminal and editing the downloaded file; and
when the file is updated via the editing, replacing the file stored in the remote location with the updated file by receiving the updated file from the user terminal by the file management server.

14. A computing device, comprising:
one or more processors;
a memory configured to load a computer program executed by the processor; and
a storage configured to store the computer program comprising instructions that cause the processor to perform operations comprising:
detecting an attempt for a user terminal to access a file stored in a remote location;
determining a location where the file attempted to be access is to be opened;
in response to a determination that the location where the file is to be opened is a remote location, opening the file and providing a content of the opened file to the user terminal by a file management server; and
in response to a determination that the location where the file is to be opened is local, processing the file to be downloaded to the user terminal by the file management server,
wherein the determining of the location where the file is to be opened comprises:
detecting a state of a network between the remote location and the user terminal; and
when the state of the network is determined to be stable, determining the location where the file is to be opened as remote, and when the state of the network is determined to be unstable, determining the location where the file is to be opened as local.

15. The computing device of claim 14, wherein the determining of the location where the file is to be opened comprises:
identifying the cumulative number of storages that a storage operation takes place for the file; and
when the cumulative number of storages is less than or equal to a threshold number, determining the location where the file is to be opened as remote, and when the cumulative number of storages is higher than the threshold number, determining the location where the file is to be opened as local.

16. The computing device of claim 14, wherein the determining of the location where the file is to be opened comprises:
identifying the amount of available resources of the file management server or a file storage server of the remote location; and
when the amount of available resources is within a permittable range, determining the location where the file is to be opened as remote, and when the amount of available resources is deviated from the permittable range, determining the location where the file is to be opened as local.

17. The computing device of claim 14, wherein the determining of the location where the file is to be opened, comprises:
identifying the location where the file is to be opened;
identifying a security level applied to the file; and
identifying whether the file is a file permitted to download based on the identified security level, and when the file is a file not permitted to download, determining the location where the file is to be opened as remote, and when the file is the file permitted to download, determining the location where the file is to be opened as local.

18. A method for managing access to a file stored in a remote location, the method performed by a user terminal, the method comprising:
requesting the file stored in the remote location;
determining a location where the file is to be opened;
when the location where the file is to be opened is determined as remote, opening the file via resources of the remote location and receiving a content of the opened file from a server of the remote location; and
when the location where the file is to be opened is determined as local, downloading the requested file from the server of the remote location and opening the downloaded file using the local resources,
wherein the determining the location where the file is to be opened comprises:
detecting a state of a network between the remote location and the user terminal; and
when the state of the network is determined to be stable, determining the location where the file is to be opened as remote, and when the state of the network is determined to be unstable, determining the location where the file is to be opened as local.

* * * * *